US012806683B2

United States Patent

(12) United States Patent
Schooler et al.

(10) Patent No.: US 12,806,683 B2
(45) Date of Patent: Nov. 24, 2026

(54) HIGH PRESSURE INLINE FILTRATION ASSEMBLIES

(71) Applicant: ENTEGRIS, INC., Billerica, MA (US)

(72) Inventors: Benjamin Schooler, Belmont, MA (US); Virendra Warke, North Chelmsford, MA (US)

(73) Assignee: ENTEGRIS, INC., Billerica, MA (US)

( * ) Notice: Subject to any disclaimer, the term of this patent is extended or adjusted under 35 U.S.C. 154(b) by 455 days.

(21) Appl. No.: 18/383,356

(22) Filed: Oct. 24, 2023

(65) Prior Publication Data

US 2024/0131579 A1 Apr. 25, 2024
US 2024/0227001 A9 Jul. 11, 2024

Related U.S. Application Data

(60) Provisional application No. 63/418,879, filed on Oct. 24, 2022.

(51) Int. Cl.
*B22D 43/00* (2006.01)
*B01D 35/30* (2006.01)

(52) U.S. Cl.
CPC ........... *B22D 43/004* (2013.01); *B01D 35/30* (2013.01); *B01D 2201/20* (2013.01); *B01D 2201/30* (2013.01); *B01D 2201/34* (2013.01); *B01D 2201/4092* (2013.01)

(58) Field of Classification Search
None
See application file for complete search history.

(56) References Cited

U.S. PATENT DOCUMENTS 504,238 A * 8/1893 Owen ........................ C02F 1/78 266/205
751,918 A * 2/1904 Jagger ..................... B01D 35/02 210/454
768,951 A * 8/1904 Rawson ................. B01D 35/02 210/493.1
872,437 A * 12/1907 Leonard ................. B01D 29/01 285/354
979,481 A * 12/1910 Hannold ................. F16L 55/24 210/448
984,082 A * 2/1911 Edgerton .................. B05B 1/12 137/550
1,020,782 A * 3/1912 Tinker ............... B01D 46/0004 55/DIG. 32

(Continued)

FOREIGN PATENT DOCUMENTS

CN 114401777 A 4/2022
EP 3319706 B1 * 12/2020 ............. B01D 25/00

(Continued)

OTHER PUBLICATIONS

Confined Gasket Closure Reactors Assembly Instructions, High Pressure Equipment Company, pp. 1-3, 2025 (https://www.highpressure.com/products/reactors-pressure-vessels/confined-gasket-closure-reactors/).

*Primary Examiner* — Robert J Popovics

(57) ABSTRACT

Described are high pressure filter housings and apparatuses that are useful to contain a fluid under high pressure, with example housings including first and second pieces having complimentary tapered joint surfaces that can form a fluid-tight seal without a gasket located between the surfaces, and methods of making and using the high pressure filter apparatuses.

13 Claims, 3 Drawing Sheets

(56) References Cited

U.S. PATENT DOCUMENTS 1,076,128 A * 10/1913 Kupferle .............. B01D 35/153 137/542
1,140,758 A * 5/1915 Miller .................... B01D 35/02 285/119
1,335,899 A * 4/1920 Kahlenberg ........... B01D 35/04 210/446
1,458,464 A * 6/1923 Byers ..................... B01D 35/02 210/497.3
1,488,671 A * 4/1924 Hale ...................... B01D 29/01 210/446
1,631,822 A * 6/1927 Jahn ....................... B01D 35/02 210/312
1,688,401 A * 10/1928 Slagel .................... B01D 35/02 210/448
1,784,622 A * 12/1930 Dardani ................. B01D 35/02 210/437
1,788,412 A * 1/1931 Sperry ................... B01D 29/44 210/488
1,802,423 A * 4/1931 Torkild .................. B01D 29/44 210/446
1,888,150 A * 11/1932 Walker ................... B01D 46/10 55/486
1,961,498 A * 6/1934 Krueger ................. B01D 35/02 210/497.3
2,068,837 A * 1/1937 Aronson ................ B01D 35/02 55/482
2,068,858 A * 1/1937 Jones ................. B01D 46/0012 55/482
2,266,368 A * 12/1941 Hull ....................... D01D 1/106 264/8
2,304,492 A * 12/1942 Aue ....................... B01D 29/44 210/446
2,375,646 A * 5/1945 Grossi ..................... F25B 41/37 184/7.3
2,376,739 A * 5/1945 Walker, Jr. ............. B01D 29/33 210/462
2,418,247 A * 4/1947 Dalzell .................. B01D 35/02 210/441
2,421,329 A * 5/1947 Hoffer .................... F02M 55/02 210/117
2,491,796 A * 12/1949 Baume .................... F16L 55/24 210/497.3
2,530,283 A * 11/1950 Brown ................... B01D 35/02 210/441
2,545,789 A * 3/1951 Miller .................... B01D 35/02 138/43
2,598,818 A * 6/1952 Muirhead .............. B01D 35/04 210/453
2,604,958 A * 7/1952 Leufvenius ............. F16N 21/02 184/105.3
2,607,954 A * 8/1952 Schneider ............... B29C 48/69 264/169
2,761,529 A * 9/1956 Wisenbaugh ......... B60T 17/002 55/482
2,779,478 A * 1/1957 Wahlin .................... B21B 45/08 210/462
2,784,843 A * 3/1957 Braunlich .............. B01D 29/05 210/247
2,792,122 A * 5/1957 Munch ................... D01D 1/106 210/489
2,895,167 A * 7/1959 Paggi .................... B29C 48/694 425/197
2,915,187 A * 12/1959 Jaffe ....................... F23D 14/68 210/451
2,963,282 A * 12/1960 Scheibe ................. F02M 69/04 261/76
2,979,207 A * 4/1961 Sugalski ................ B01D 29/03 210/446
3,004,671 A * 10/1961 Sugalski ................ B01D 29/03 210/446
3,010,583 A * 11/1961 Kenyon ................... G01N 1/14 210/406
3,011,644 A * 12/1961 Mankin .................. B01D 29/23 210/453
3,109,459 A * 11/1963 Lee, II .................... F15B 21/00 138/40
3,121,685 A * 2/1964 Hazell .................... B01D 29/03 210/451
3,170,872 A * 2/1965 Balogh ................ B01D 36/003 210/287
3,240,342 A * 3/1966 Callahan, Jr. .......... B01D 35/02 210/450
3,240,346 A * 3/1966 Callahan, Jr. .......... B01D 29/33 210/448
3,280,982 A * 10/1966 Barto ...................... F16L 55/24 210/446
3,295,684 A * 1/1967 Webb ..................... B01D 29/05 210/453
3,307,216 A * 3/1967 Dunn ....................... D01D 4/06 425/464
3,317,043 A * 5/1967 Vanderpoel ............ B01D 35/02 210/453
3,332,557 A * 7/1967 Pall ........................ B01D 29/23 210/497.3
3,374,673 A * 3/1968 Trageser ................... G01F 1/44 73/202
3,386,585 A * 6/1968 Weyand .............. A61M 5/3145 210/446
3,397,794 A * 8/1968 Toth ................... B01D 21/0039 210/488
3,441,145 A * 4/1969 Pearson ................. B01D 46/10 210/451
3,458,050 A * 7/1969 Cooper .................. B01D 35/02 210/493.2
3,474,911 A * 10/1969 Olsen ..................... B01D 37/02 210/318
3,475,527 A * 10/1969 Chapman ............... D01D 1/106 425/382.2
3,493,115 A * 2/1970 Koches .................. B01D 35/02 55/502
3,516,688 A * 6/1970 Gachot ................. F16L 23/006 137/454.2
3,521,910 A * 7/1970 Callahan, Jr. ....... F16L 19/0218 277/330
3,556,298 A * 1/1971 Werner ................ B01D 35/147 210/493.1
3,557,536 A * 1/1971 Ririe ...................... B01D 46/10 55/504
3,592,768 A * 7/1971 Parker ..................... F16L 55/24 210/495
3,715,870 A * 2/1973 Guzick .................. B01D 35/02 138/44
3,724,064 A * 4/1973 Mott ....................... B23P 11/02 425/464
3,731,815 A * 5/1973 Collingwood ....... B01D 35/023 210/497.2
3,746,642 A * 7/1973 Bergstrom ............. B01D 29/52 210/446
3,753,500 A * 8/1973 Voegeli .................. B01D 35/02 210/446
3,767,056 A * 10/1973 Neuman ................. B29C 45/24 210/418
3,789,990 A * 2/1974 Drori ..................... B01D 35/22 210/488
3,794,180 A * 2/1974 Blocker ................. B01D 35/02 210/446
3,794,360 A * 2/1974 Bachle ..................... F16L 23/16 285/148.13
3,797,665 A * 3/1974 Paquette ............... B29C 48/254 210/236
3,802,821 A * 4/1974 Mott ...................... D01D 1/106 210/446
3,815,744 A * 6/1974 Vanderpoel ............ B01D 35/02 210/453
3,825,123 A * 7/1974 Neuman ................. B29C 45/24 55/282
3,841,489 A * 10/1974 Combest .............. F02M 27/045 210/223

(56) References Cited

U.S. PATENT DOCUMENTS 3,876,545 A * 4/1975 Norwood ............ B29C 48/6912 210/236
3,877,895 A * 4/1975 Wonderland ............. F16T 1/34 138/44
3,890,232 A * 6/1975 Combest ................ B01D 35/06 210/223
3,957,644 A * 5/1976 Edmonson ............ B01D 35/02 210/167.13
3,985,654 A * 10/1976 Pall ....................... B01D 29/54 210/477
3,993,561 A * 11/1976 Swearingen ......... B01D 35/147 210/446
4,018,687 A * 4/1977 Zahour ................. B01D 35/30 55/498
4,028,248 A * 6/1977 Murauskas .......... B01D 29/016 210/450
4,116,837 A * 9/1978 Biermacher ........... G01N 30/08 210/446
4,116,844 A * 9/1978 Hein ................... B01D 29/055 210/477
4,155,247 A * 5/1979 Kaczmarek .......... G01N 1/2202 96/138
4,171,209 A * 10/1979 Brown .................... F16L 55/09 210/450
4,260,350 A * 4/1981 Russell, Jr. ............ D01D 1/106 425/197
4,263,140 A * 4/1981 Wujnovich ............ B01D 35/02 210/493.5
4,283,280 A * 8/1981 Brownlee ............. B01D 15/22 210/198.2
4,287,065 A * 9/1981 Raines ................... B01D 29/03 210/446
4,300,592 A * 11/1981 Hartley .............. G05D 16/0658 137/505.25
4,434,053 A * 2/1984 Osuna-Diaz ............ B29C 45/24 210/446
4,442,003 A * 4/1984 Holt ....................... B01D 35/02 210/451
4,557,834 A * 12/1985 Mason ................... B01D 35/02 210/450
4,582,605 A * 4/1986 Rea ........................ B01D 29/35 210/450
4,806,248 A * 2/1989 Murken ................. B01D 29/96 285/305
4,886,533 A * 12/1989 Sakashita ........... B01D 46/2407 55/498
4,894,156 A * 1/1990 Murken ................. B01D 29/23 285/305
4,902,319 A * 2/1990 Kato .................. B01D 46/2429 60/311
4,944,876 A * 7/1990 Miller .................... B01D 29/58 210/450
5,062,952 A * 11/1991 Neuman ................ B01D 29/35 425/197
5,064,542 A * 11/1991 Negersmith ........... B01D 39/10 436/63
5,114,447 A * 5/1992 Davis ..................... B22F 3/1103 55/482
5,266,089 A * 11/1993 Blocker ................. B01D 50/20 55/319
5,284,586 A * 2/1994 DeSalvo .............. B01D 29/012 55/497
5,338,448 A * 8/1994 Gjerde ................... G01N 30/14 96/101
5,407,348 A * 4/1995 Mims ...................... F23D 14/42 137/454.2
5,467,796 A * 11/1995 Pettinaroli ............ F16K 27/067 137/238
5,490,868 A * 2/1996 Whitlock ............. B01D 29/114 55/504
5,492,143 A * 2/1996 Cooper ................ B01D 35/157 137/550
5,492,623 A * 2/1996 Ishibe ................ B01D 46/0001 210/453
5,522,910 A * 6/1996 Fogal, Sr. .......... B01D 46/0012 55/528
5,536,402 A * 7/1996 Kluhsman ............. B01D 35/02 210/232
RE35,316 E * 8/1996 Negersmith ........... B01D 29/03 436/63
5,545,242 A * 8/1996 Whitlock ............... B01D 46/10 55/502
5,545,318 A * 8/1996 Richmond ............ B01D 29/15 210/232
5,766,469 A * 6/1998 Boast ................ B29C 45/14467 137/550
5,772,116 A * 6/1998 Holt ...................... F16L 35/005 251/149.6
5,783,223 A * 7/1998 Anderson ............. B29C 48/694 425/185
5,804,366 A * 9/1998 Hu .......................... A61F 2/062 435/395
5,823,438 A * 10/1998 Holt .......................... B05B 7/32 239/581.1
5,857,622 A * 1/1999 Holt ........................ B05B 9/035 251/315.13
5,862,667 A * 1/1999 Prince ....................... F02C 7/22 60/734
5,911,954 A * 6/1999 Ford .................. G01N 30/6039 210/198.2
5,917,066 A * 6/1999 Eisenmann ........ B01D 46/0012 55/502
5,935,434 A * 8/1999 Cates ..................... B01D 29/03 137/550
5,951,728 A * 9/1999 Hopson ............. B01D 46/0012 55/482
5,954,961 A * 9/1999 Carchidi ................ B01D 35/02 210/455
6,039,885 A * 3/2000 Behar ................ B01D 39/2068 210/791
6,090,282 A * 7/2000 Roman .................. B01D 35/02 285/248
6,116,274 A * 9/2000 Ehrlich ............... F16K 37/0058 137/550
6,164,558 A * 12/2000 Holt ...................... B05B 7/2489 285/86
6,210,458 B1 * 4/2001 Shindo ................... B01D 46/10 264/642
6,322,696 B1 * 11/2001 McKee .................. B01D 29/15 210/450
6,346,192 B2 * 2/2002 Buhr ...................... B01D 35/02 210/450
6,572,029 B1 * 6/2003 Holt ...................... B05B 7/2486 285/86
6,605,217 B2 * 8/2003 Buhr .................... B01D 63/089 210/450
6,672,135 B2 * 1/2004 Adiletta ............. G01N 15/0272 210/651
6,716,275 B1 * 4/2004 Reed ....................... C04B 41/89 96/10
6,846,412 B2 * 1/2005 Hogan ................. B01D 29/012 210/231
6,923,908 B1 * 8/2005 Thompson ........... B01D 39/083 210/198.2
6,938,437 B2 * 9/2005 Velez .................... F16L 19/065 210/232
7,112,237 B2 * 9/2006 Zeller ..................... B22F 7/002 55/516
7,143,898 B1 * 12/2006 Hoaglin ................. B01D 35/02 210/448
7,247,245 B1 * 7/2007 Proulx ................... B01D 27/07 210/450
7,275,606 B1 * 10/2007 Sims ....................... E21B 21/06 175/218
7,547,049 B2 * 6/2009 Gashgaee ............... F04B 53/16 285/384
8,097,071 B2 * 1/2012 Burgess ............. B01D 39/2044 55/523

(56) References Cited

U.S. PATENT DOCUMENTS

| | | | | |
|---|---|---|---|---|
| 8,167,967 | B2 * | 5/2012 | Kim | B01D 46/42 55/420 |
| 8,182,702 | B2 * | 5/2012 | Al-Sannaa | B01D 35/02 210/806 |
| 8,282,700 | B2 * | 10/2012 | Walz | F16L 55/24 55/498 |
| 8,393,898 | B2 * | 3/2013 | McCary | A61C 17/065 433/91 |
| 8,460,422 | B2 * | 6/2013 | McClure | F01N 3/2033 123/468 |
| 8,496,821 | B2 * | 7/2013 | Ringenberger | B01D 29/111 210/232 |
| 8,534,467 | B2 * | 9/2013 | Haas | E03B 7/07 285/354 |
| 8,673,065 | B2 * | 3/2014 | Burgess | B22F 7/002 55/485 |
| 8,679,334 | B2 * | 3/2014 | Becker | B03C 1/0332 210/232 |
| 8,890,099 | B2 * | 11/2014 | Hultermans | B22D 43/004 250/493.1 |
| 8,936,723 | B2 * | 1/2015 | Nickerson | B01D 15/22 210/656 |
| 9,029,813 | B2 * | 5/2015 | Fomenkov | B01D 29/56 250/504 R |
| 9,308,584 | B2 * | 4/2016 | Burgess | B01D 39/2044 |
| 9,462,667 | B2 * | 10/2016 | Dijksman | G03F 7/70033 |
| 9,510,432 | B2 * | 11/2016 | Kempen | B05B 17/0653 |
| 9,645,500 | B2 * | 5/2017 | Noordman | G02B 27/44 |
| 9,655,222 | B2 | 5/2017 | Van Den Akker et al. | |
| 9,669,334 | B2 * | 6/2017 | Fomenkov | B01D 29/56 |
| 9,671,384 | B2 * | 6/2017 | Rogel | G01N 33/2835 |
| 9,715,174 | B2 * | 7/2017 | Dijksman | B05B 17/06 |
| 9,776,122 | B2 * | 10/2017 | Witengier | B01D 46/24 |
| 10,136,509 | B2 * | 11/2018 | Hori | H05G 2/002 |
| 10,149,374 | B1 * | 12/2018 | Ridinger | H05G 2/0094 |
| 10,159,927 | B2 * | 12/2018 | Pereira | B01D 53/261 |
| 10,202,871 | B2 * | 2/2019 | Ryon | F02C 7/222 |
| 10,237,961 | B2 * | 3/2019 | Hori | H05G 2/002 |
| 10,280,719 | B1 * | 5/2019 | O'Neal | E21B 21/065 |
| 10,481,498 | B2 * | 11/2019 | Dijksman | G03F 7/70033 |
| 10,499,485 | B2 * | 12/2019 | Winkels | B81C 1/00134 |
| 10,750,604 | B2 * | 8/2020 | Dijksman | H05G 2/0023 |
| 10,786,776 | B2 * | 9/2020 | Pereira | B01D 53/0415 |
| 10,894,233 | B2 * | 1/2021 | Scoggins | B01D 39/2065 |
| 10,904,994 | B2 * | 1/2021 | Winkels | B81C 1/00134 |
| 10,927,347 | B2 * | 2/2021 | Pilkington | A61M 1/892 |
| 11,020,691 | B2 * | 6/2021 | Banks | B01D 29/00 |
| 11,054,074 | B2 * | 7/2021 | Heon | F16L 37/008 |
| 11,224,830 | B2 * | 1/2022 | Wildermuth | B01D 29/96 |
| 11,383,416 | B2 * | 7/2022 | Veariel | B29C 48/69 |
| 11,433,338 | B2 * | 9/2022 | Randolph | B01D 25/00 |
| 12,091,946 | B2 * | 9/2024 | Nath | B01D 29/33 |
| 12,110,069 | B2 * | 10/2024 | Kuntzelman | B62D 5/062 |
| 12,180,817 | B2 * | 12/2024 | Trueheart | B01D 29/15 |
| 12,427,455 | B2 * | 9/2025 | Hamkens | B01D 35/02 |
| 12,529,685 | B2 * | 1/2026 | Loux | G01N 30/6026 |
| 12,663,403 | B2 * | 6/2026 | Loux | G01N 30/6026 |
| 12,667,799 | B2 * | 6/2026 | Okuno | B01D 35/023 |
| 2001/0037975 | A1 * | 11/2001 | Buhr | B01D 29/58 210/639 |
| 2006/0096908 | A1 * | 5/2006 | Wolf | B29C 48/694 210/451 |
| 2006/0151376 | A1 * | 7/2006 | Tubbs | B01D 35/02 210/335 |
| 2007/0039871 | A1 * | 2/2007 | Zarbi | B01D 29/114 239/289 |
| 2007/0218160 | A1 * | 9/2007 | Sehlstedt | B30B 11/002 425/405.2 |
| 2009/0166301 | A1 * | 7/2009 | Ringenberger | B01D 29/111 210/232 |
| 2010/0116732 | A1 * | 5/2010 | Jung | B01D 35/02 210/447 |
| 2010/0155345 | A1 * | 6/2010 | Al-Sannaa | B01D 35/02 210/806 |
| 2010/0192777 | A1 * | 8/2010 | Walz | F16L 55/24 96/423 |
| 2011/0114195 | A1 * | 5/2011 | Haas | F16L 55/24 137/15.01 |
| 2012/0292527 | A1 * | 11/2012 | Fomenkov | B01D 29/56 250/428 |
| 2013/0240062 | A1 * | 9/2013 | Hoss | B01D 25/00 137/544 |
| 2013/0312501 | A1 * | 11/2013 | Dewey | B01D 29/01 73/61.56 |
| 2014/0001744 | A1 * | 1/2014 | Haas | B01D 35/02 285/5 |
| 2014/0209817 | A1 * | 7/2014 | Hultermans | B22D 43/004 250/492.1 |
| 2015/0015863 | A1 * | 1/2015 | Kempen | B05B 17/0653 73/579 |
| 2015/0055106 | A1 * | 2/2015 | Dijksman | G03F 7/70033 250/504 R |
| 2015/0209701 | A1 * | 7/2015 | Fomenkov | B01D 29/56 210/348 |
| 2015/0293456 | A1 * | 10/2015 | Dijksman | B05B 17/06 239/102.1 |
| 2016/0195819 | A1 * | 7/2016 | Noordman | G02B 27/44 250/504 R |
| 2016/0333305 | A1 * | 11/2016 | Pilkington | C12M 45/02 |
| 2017/0204746 | A1 * | 7/2017 | Ryon | F02C 7/222 |
| 2018/0193785 | A1 * | 7/2018 | Randolph | B01D 46/0005 |
| 2018/0364580 | A1 * | 12/2018 | Dijksman | G03F 7/70033 |
| 2018/0368241 | A1 * | 12/2018 | Dijksman | H05G 2/0023 |
| 2018/0368242 | A1 * | 12/2018 | Winkels | B81C 1/00134 |
| 2019/0009201 | A1 * | 1/2019 | Scoggins | B01D 39/2065 |
| 2019/0030457 | A1 * | 1/2019 | DeLine | G01N 30/60 |
| 2019/0045614 | A1 * | 2/2019 | Hori | H05G 2/002 |
| 2020/0054973 | A1 * | 2/2020 | Wildermuth | B01D 35/02 |
| 2020/0128657 | A1 * | 4/2020 | Winkels | B81C 1/00134 |
| 2020/0344868 | A1 * | 10/2020 | Purvis | G03F 7/70033 |
| 2021/0037634 | A1 * | 2/2021 | Hsiao | G03F 7/70033 |
| 2021/0113951 | A1 * | 4/2021 | Oh | B01D 46/71 |
| 2021/0130783 | A1 * | 5/2021 | Pilkington | C12M 45/02 |
| 2021/0222524 | A1 * | 7/2021 | Nath | B01D 29/33 |
| 2023/0110390 | A1 * | 4/2023 | Loux | G01N 30/6026 210/91 |
| 2024/0060408 | A1 * | 2/2024 | Trueheart | B01D 29/15 |
| 2024/0131458 | A1 * | 4/2024 | Warke | B01D 46/0001 |
| 2024/0131579 | A1 * | 4/2024 | Schooler | B01D 35/02 |
| 2024/0226785 | A9 * | 7/2024 | Warke | B01D 46/2403 |
| 2024/0226786 | A1 * | 7/2024 | Hamkens | B01D 35/02 |
| 2024/0227001 | A9 * | 7/2024 | Schooler | B01D 35/02 |
| 2024/0399275 | A1 * | 12/2024 | Okuno | B01D 35/023 |
| 2025/0375723 | A1 * | 12/2025 | Nehlen, III | B01D 36/02 |
| 2026/0048346 | A1 * | 2/2026 | Nehlen, III | B01D 24/10 |

FOREIGN PATENT DOCUMENTS

| | | | | |
|---|---|---|---|---|
| WO | WO-2017007709 | A1 * | 1/2017 | F02M 55/005 |
| WO | WO-2024091500 | A1 * | 5/2024 | B01D 39/2027 |
| WO | WO-2024091505 | A1 * | 5/2024 | C22B 9/02 |

* cited by examiner

HIGH PRESSURE INLINE FILTRATION ASSEMBLIES

FIELD

This description relates to housings and apparatuses that are useful to contain a fluid under high pressure.

BACKGROUND

Across a very wide range of industries and applications, various types of fluid containers and fluid processing vessels are designed to to contain liquid or gaseous fluids at high pressure. Examples include isotactic press devices (see, e.g., United States Patent Application 2007/0218160), pressurized flow control structures (see, e.g., United States Patent Application 2013/0240062), and high pressure filter apparatuses (see e.g., United States Patent Application 2018/0193785).

The fluid container or vessel must be capable of containing a fluid either in a static condition or under a flow condition, at high pressure and for a sustained period. The container or vessel must be stable to the pressure and temperature conditions of the fluid and must be chemically stable and not degraded by the contained fluid. The container or vessel is constructed from components that fit together and form fluid-tight seals that prevent fluid from escaping the container or vessel interior.

The need for high pressure fluids extends across many industries, including chemical processing industries, automotive and aerospace industries, and the semiconductor manufacturing industry as a more specific example. According to these applications, a process of using the fluid can often require the fluid to be significantly free from impurities. Consequently, many systems that use a fluid at high pressure include a filter apparatus that removes impurities from the fluid while the fluid is in a pressurized condition.

Semiconductor manufacturing operations require high purity fluids for various processing steps. As an example, liquid tin is a type of molten metal that is used for producing extreme ultraviolet (EUV) radiation, which is used in photolithography processes. For use in a photolithography process, liquid tin should be free from impurities, contaminants, and particulates that can disrupt the process. Filtering the molten metal to remove impurities requires the molten metal to pass through a filter at a high pressure and a high temperature.

The filter and the flow of liquid metal must be contained in a filtering apparatus that is leak-proof at a temperature that can exceed 200 degrees Celsius and at a pressure that can exceed 5,000 pounds per square inch, gauge (psig), or that exceeds a pressure of 8,000 psig or more. Certain filtering apparatus designs that are presently available can be useful at temperatures and pressures that approach or meet these ranges for filtering a fluid under pressure. But as with many commercial efforts, the need for improved performance is constant. Current or previous designs of high pressure filtering equipment must be continually improved to meet ever-higher performance requirements.

There is a continuing need for filtration equipment that provides leak-proof performance at high temperatures and pressures for the filtration of various fluids, including molten metals, other types of liquids, and gases.

SUMMARY

Described are high pressure filter apparatuses that are capable of withstanding very high internal pressure without leaking or otherwise failing. Examples include a housing piece and an end piece, with a tapered joint having complementary tapered surfaces between the housing piece and the end piece. A mechanical fitting releasably secures the end piece to the housing piece to form a seal between the tapered joint surfaces. The tapered joint is formed between a surface of the housing piece and a surface of the end piece, and no gasket is present between the surfaces. Also described are methods of making and using a high pressure filter apparatus.

Various known filtering systems exist that are useful for filtering a fluid at a high pressure and at high temperature. Some of these involve filter housing structures that are made of metal formed with a weld or by brazing. Welded and brazed structures are useful and can accommodate high internal pressures, but a welded or brazed seam in a pressure vessel can create a location of reduced strength. For example, welding a refractory metal or alloy can cause a reduction in material strength of as much as 50 percent due to re-crystallization.

United States Patent publication 2018/0193785 describes a high pressure filter apparatus that can avoid the need for a welded seam, and that uses a tapered (e.g., conical) engagement between two housing portions, with a gasket being placed between the surfaces of the tapered engagement to form a seal. A gasket to produce a high pressure seal can create manufacturing and operating challenges. A gasket may slip, degrade, or otherwise fail, which may result in failure of the seal and leaking at the seal, particularly when the seal and gasket are subject to significantly high pressure. Further, as an additional structural element of the filter apparatus, a gasket can act as a source of contamination. Still further, the gasket material will exhibit physical properties that are different from those of the other components of the filter apparatus, including a different coefficient of thermal expansion.

In one aspect, the disclosure relates to a high pressure filter apparatus having sealing surfaces between a housing piece and an end piece. The apparatus includes: the housing piece that includes a first tapered joint surface, a filter chamber, and a fluid flow opening connected to the filter chamber; a filter located in the filter chamber; the end piece that includes a second tapered joint surface contacting the first tapered joint surface under pressure without a gasket material placed between the first tapered joint surface and the second tapered joint surface, and a fluid flow opening connected to the filter chamber; and a mechanical fitting that releasably secures the end piece to the housing piece with pressure to form a seal between the first tapered joint surface and the second tapered joint surface.

In another aspect the disclosure relates to a method of filtering a fluid. The method includes: providing a high pressure filter apparatus that includes a housing piece comprising a first tapered joint surface, a filter chamber, and a fluid flow opening connected to the filter chamber; a filter located in the filter chamber; an end piece comprising a second tapered joint surface contacting the first tapered joint surface under pressure, without a gasket material placed between the first tapered joint surface and the second tapered joint surface, and a fluid flow opening connected to the filter chamber; and a mechanical fitting that releasably secures the end piece to the housing piece with pressure to form a seal between the first tapered joint surface and the second tapered joint surface; and passing fluid that contains an impurity through the filter to cause the impurity to be removed from the fluid.

In another aspect, the disclosure relates to a method of forming a high pressure filter apparatus. The method includes providing: a filter; a housing piece comprising a first tapered joint surface, a filter chamber, and a fluid flow opening connected to the filter chamber; and an end piece comprising a second tapered joint surface adapted to contact the first tapered joint surface under pressure. The method further includes: securing the filter at a location within the filter chamber; and connecting the end piece to the housing piece using a mechanical fitting, with pressure to form a seal between the first tapered joint surface and the second tapered joint surface, without placing a gasket material between the first tapered joint surface and the second tapered joint surface.

In yet another aspect, the disclosure relates to a high pressure filter apparatus. The apparatus includes: a fluid inlet at an inlet end; a fluid outlet at an outlet end; metal sidewalls between the fluid inlet and the fluid outlet; a filter chamber defined by the metal sidewalls; and a filter located in the filter chamber. The apparatus is capable of containing fluid in the filter chamber at a fluid pressure of at least 40,000 psig at 20 degrees Celsius without leaking.

Figure 1A:
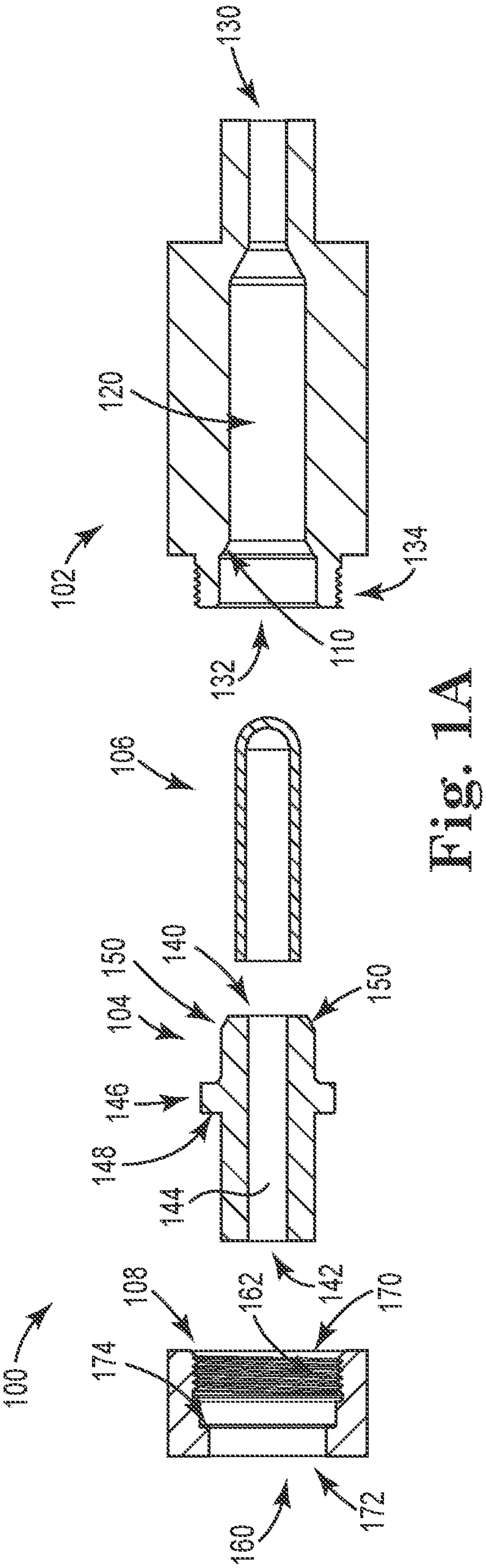
FIGS. 1A and 1B show an exploded view and an assembled view of an example filtering apparatus as described.

The figures are intended as non-limiting examples, are schematic, and are not necessarily to scale.

DETAILED DESCRIPTION

Described are high pressure filter apparatus that include a housing piece and an end piece, with a tapered joint between opposed complementary tapered surfaces of the housing piece and the end piece, and no gasket between the two tapered joint surfaces. A mechanical fitting is used to releasably secure the end piece to the housing piece and apply pressure between the two opposed joint surfaces to produce a seal between the tapered joint surfaces. Also described are methods of making and using a high pressure filter apparatus.

As used herein, a "mechanical fitting" refers to a mechanical engagement that is useful to join pieces of an apparatus as described into an assembled and functional apparatus, and that can be selectively assembled and dis-assembled to assemble and dis-assemble the apparatus. The mechanical fitting is preferably capable of applying a varied amount of pressure between two pieces of the apparatus, particularly at two tapered joint surfaces as described. Examples of useful mechanical fittings include opposed threaded surfaces. A portion of a fitting, e.g., a threaded surface, may be included at a surface of a housing piece, at a surface of an end piece, or may be present at a piece other than an end piece or a housing piece.

Previous filter apparatus designs have proposed to use complementary tapered surfaces to form a seal, but the designs involve the use of a gasket between the two surfaces. See United States Patent Application 2018/0193785.

In contrast, a seal as described between two opposing tapered surfaces does not require placing a gasket material or device between the two surfaces Eliminating a gasket from a high pressure seal produces certain advantages. A gasket has the potential to fail or degrade during use, especially under a significantly high pressure. A gasket also adds steps and material requirements when designing and assembling a filtering apparatus, and can be a source of contamination of a fluid passing through filter apparatus. Still further, a gasket material will exhibit physical properties that are different from those of the other components of the filter apparatus, including a different coefficient of thermal expansion, which causes different expansion and contraction properties of components of the filter apparatus during temperature changes.

According to the present description, the term "gasket" refers to a material that can exist in a form that is physically separate from both of the two surfaces of the tapered joint, can be placed between the surfaces when assembling the filter apparatus and, preferably, may be removed or repositioned as needed during assembly without damaging either of the surfaces. When included between the joint surfaces and placed under pressure, the gasket produces a seal between the two opposed joint surfaces that does not allow fluid to flow through the surfaces to leak from the joint.

Examples of known gasket materials include thin layers of solid or flowable material that can be placed in contact with each of two opposed surfaces of a joint, and that have a thickness, compressibility, and conformability to allow the gasket material, when placed under pressure between the two surfaces of the joint, to contact the two opposed surfaces of the joint and prevent fluid from flowing between the opposed surfaces of the joint. These include metal gaskets in the form of a thin metal sheet that is placed between two opposed joint surfaces; polymeric adhesive with optional solvent placed between two opposed joint surfaces; cork or fabric or cardboard or another similar compressible material; "form-in-place" gasket materials that include curable polymer such as silicone and optional solvent; Teflon (e.g., as a paste, or tape); among others.

According to the present description, the two opposed surfaces of a tapered joint of a high pressure filter apparatus do not require and can specifically exclude the presence of any of these or another type of gasket material, and the two opposed tapered surfaces of the tapered joint are in direct contact to form a seal that is effective to prevent the flow of fluid through the seal.

The term "gasket" does not include a material that is applied or formed in a very small amount as a thin layer of material at a surface of a tapered joint, that cannot be separated from the surface without damaging the underlying surface. Examples of these materials, which are not considered to be "gaskets," include materials that are deposited onto one or both of the two opposing tapered surfaces by a deposition method such as electroplating (anodization), atomic layer deposition ("ALD"), chemical vapor deposition ("CVD"), physical vapor deposition ("PVD"), or a derivative thereof. Typically, the material applied by such method cannot be removed from the surface without damaging the surface. Also typically, the material can have a thickness that is less than 10 microns or less than 5 microns, or less than 1 micron, before being assembled under pressure as a surface of the tapered joint.

The term "gasket" also does not refer to a tapered joint surface that has been treated to affect a mechanical property of the surface, e.g., irreversibly, such as by heat treatment to improve a hardness property, by a passivation method, or the like. See below.

A tapered joint is a joint that includes two opposed tapered surfaces, with each tapered surface having a three-dimensional form centered on the length-wise axis of the housing, extending in a lengthwise direction along a length of a housing, with two ends and an opening at each of the two ends. An opening at one end of the tapered joint is larger than an opening at the opposite end of the joint. Between the larger-diameter open end and the smaller-diameter open end, the diameter of a tapered joint surface diminishes e.g., the opposed joint surfaces extend in a direction along the length of the housing, and the sizes (diameters) of the opposed joint surfaces gradually decrease along the length of the joint surfaces.

According to certain examples of tapered joints, opposed tapered joint surfaces are conical, meaning that the surfaces gradually taper along a straight line, i.e., are linearly-tapered. Other examples of tapered joints include two opposed tapered joint surfaces that taper along a line that is not linear but is curved or rounded along the length of the surface between the two open ends.

To form a high pressure seal between two tapered surfaces without adding a gasket between the two surfaces, certain features of the tapered joint surfaces that form the seal can be controlled or selected. Some features of the opposed tapered surfaces that can be selected to produce a tapered joint that has an effective seal at high pressure include: the angles of the two tapered surfaces, which may be the same or slightly different; the size (area) of the two tapered surfaces; the finish (smoothness or roughness) of one or both of the two tapered surfaces; and the physical and mechanical properties of the two tapered surfaces such as hardness and flexibility, which result from the makeup (composition) of the two surfaces.

Additional factors that may be controlled or selected to cause the opposed tapered joint surfaces to maintain a leak-proof seal can include one or both of the operating (fluid) pressure within the filter apparatus during operation, and the pressure placed longitudinally between the two opposed tapered surfaces of the joint during operation. Regarding the former, a higher fluid pressure at the interior of the filter apparatus during use may improve the strength of a seal formed at a tapered joint. Regarding the latter, the amount of longitudinal pressure applied between the opposed tapered surfaces can affect the ability of the seal to perform without leaking; this pressure between the surfaces can be affected or controlled using a mechanical fitting as described, for example by selecting the amount of torque applied to a threaded fitting.

Example tapered joints are conically-tapered, i.e., linearly-tapered. A conical joint has two opposed surfaces that are conical, i.e., in the form of a portion of a linearly-tapered surface of a sidewall of a cone. The “angle” of a conical surface refers to an angle of an imaginary apex of the cone, which is at a location that coincides with a longitudinal axis of a housing piece or an end piece that includes the conical joint surface.

For a tapered joint that is not linearly-tapered, i.e., that is tapered but not conically-tapered, an angle of the joint refers to an angle formed at an imaginary apex of the structure by two lines that connect the apex to the largest diameter of the tapered joint surface, which is at the opposite end of the joint surface.

The angles of opposed tapered joint surfaces may be any angles (measured at an imaginary apex of a cone that contains a conical surface) that are useful together to form an effective seal when the two surfaces are engaged with pressure applied from one surface to the other surface. In some example tapered joints, an angle of a female surface and an angle of a male surface may be equal or substantially equal (within 0.1 or 0.2 degrees), with each angle being in a range from 30 to 90 degrees. In these or other example tapered joints, the male surface may have an angle that is slightly less than the angle of the female surface, e.g., an angle of a male surface may be at least 0.5 degree or at least 1 degree less than an angle of the female surface.

Optionally, one or both of the opposed surfaces of a tapered joint may be prepared or processed to have a surface texture (roughness) that will improve a seal between the surfaces. Particular examples of useful surface treatments include an electropolishing step or a mechanical polishing step. An electropolishing process, also referred to as a “reverse plating” process, uses an electrochemical solution to remove a very small amount of an outer surface of a metal part.

One or both surfaces of a tapered joint may be selected or processed to have a mechanical property such as hardness, strength, or yield to produce a seal between the surfaces that performs without leaking at elevated pressures and temperatures. Mechanical properties of the tapered seal surfaces may have different requirements than that of a gasket material used between the two surfaces, which allows for the mechanical properties of the opposed surfaces to be selected or modified to improve performance of a seal between the surfaces. For example, a heat treatment of one or both tapered surfaces may reduce or increase a surface hardness. Reducing the hardness of a surface could increase ductility, allowing for a greater ability to eliminate paths between the surfaces that would allow a leak. Increasing the hardness of a surface could increase resistance to yielding. One or both surfaces could be treated, and each surface may be treated differently, e.g., the male surface could be treated to be harder than the female surface to allow the male surface to press into the female surface without yielding.

An amount of pressure that is applied between the two surfaces can also affect performance of the seal. The pressure applied longitudinally along the length of the apparatus from one tapered surface to the other can be controlled by an amount of torque applied to a threaded mechanical fitting, e.g., at a threaded end piece of a two-piece device, or at a threaded compression collar of a three-piece device or a four-piece device (see below). If an amount of pressure applied between the surfaces is too low, the seal can more easily fail. If an amount of pressure applied between the surfaces is too high, a sealing surface may be damaged if the ultimate strength of the material of the sealing surface is reached during assembly or during operation.

A filter apparatus as described, including a housing piece, end piece, and mechanical fitting (as part of an end piece, a housing piece, or a separate piece) may be prepared from a large range of metal materials, including refractory metals (including alloys), alloys such as stainless steel, other metals such as nickel and nickel alloys, aluminum and aluminum alloys, among others. Refractory metals include niobium, molybdenum, tantalum, tungsten, rhenium, and alloys that include one or more of these such as: an alloy that contains molybdenum and rhenium (MoRe), an alloy that contains tungsten and rhenium (WRe), an alloy that contains molybdenum and hafnium and carbon (MoHfC, or “MHC”), or an alloy that contains titanium and zirconium and molybdenum (TiZrMo).

A particular material may be selected based on factors of mechanical properties such as strength and ductility, ease of processing, and compatibility with a fluid that will be contained by a filter apparatus during operation. For a filter apparatus designed to process a liquid metal at high pressure and temperature, a housing piece, an end piece, or both, may preferably be prepared from a refractory metal.

Refractory metals such as molybdenum can be preferred materials for use with filter apparatuses that process liquid metals such as tin, because refractory metals can be thermally stable and chemically resistant. Molybdenum is able to withstand high temperatures (for example, above the freezing point of tin) without significant expansion or softening. A challenge when using molybdenum, however, is that the strength of molybdenum is significantly reduced by welding, e.g., welded molybdenum may exhibit less than fifty percent of the strength of non-welded molybdenum.

To avoid loss of strength due to a weld, a filter apparatus as described uses a mechanical fitting to connect a housing piece with an end piece of a device, and does not require a welded or brazed seam. By avoiding a welded or brazed seam, a filter apparatus may be formed from materials that are selected based on compatibility with a fluid that will be contained by the device during operation, and need not be selected to provide a specific level of mechanical strength. A high pressure filter apparatus as described may be prepared from a refractory metal such as molybdenum, while avoiding a welding or bonding process that would produce a weak seam in the filter apparatus. In example devices, an end piece and a housing piece may be both made of refractory metal. If desired, the end piece and the housing piece may be made of two different materials, e.g., two different refractory metals.

Examples of filter apparatuses that are constructed and assembled according to the present description can perform at significantly high pressures and significantly high temperatures, while the tapered joint performs as a fluid-tight seal without allowing fluid to leak from the pressurized interior of the device. Examples of useful or preferred high pressure filter apparatuses can provide leak-proof filtration of a fluid such as a molten metal at pressures that reach or exceed 5,000 pounds per inch, gauge (psig), or that reach or exceed 10,000, 20,000 psig, 30,000 psig, or even 35,000, 40,000, 45,000, 50,000, 55,000, or 60,000 psig at different temperature conditions, optionally at ambient temperature (20 degrees Celsius) or at a temperature that may reach or exceed 230 degrees Celsius, e.g., 250 or 300 degrees Celsius.

A filter apparatus can be measured for performance at high pressure and ambient temperature (room temperature), or at high pressure and an operating temperature, to assess a maximum internal pressure that the apparatus can withstand without failing; failure refers to a start of any amount of leaking from the apparatus such as at the seal. These tests are sometimes referred to as "burst tests," and may be performed using water as a test fluid.

According to certain useful or preferred filter apparatuses as described, an apparatus may be capable of containing an interior pressure of of at least 40,000 psig, or at least 45,000 psig, at least 50,000 psig, at least 55,000 psig, or at least 60,000 psig, tested at 20 degrees Celsius. Also according to useful or preferred filter apparatuses as described, an apparatus may be capable of containing an interior pressure of at least 40,000 psig, or at least 45,000 psig, at least 50,000 psig, at least 55,000 psig, or at least 60,000 psig, tested at an elevated (operating) temperature, e.g., a temperature of 200 degrees Celsius or higher, or 250 degrees Celsius or higher, or 300 degrees Celsius or higher.

Example high pressure filter apparatuses can be constructed with a first piece, referred to as a "housing piece," that is mechanically secured to a second piece, referred to as an "end piece." The housing piece is structured to include two opposed ends, each of which has a fluid opening, with a length between the ends and an open interior, referred to as a "filter chamber," that is adapted to contain at least a portion of a filter. A surface of the housing piece includes a tapered joint surface.

The end piece also includes two opposed ends, each of which has a fluid opening. The end piece also includes a tapered joint surface that is complementary to the tapered joint surface of the housing piece. When the housing piece and the end piece are assembled to form a filter apparatus, a filter can be located within the filter chamber. The filter chamber may be formed substantially or entirely by the housing piece, or may be formed in part by the housing piece and in part by the end piece.

The apparatus includes a mechanical fitting that releasably secures the housing piece to the end piece. The mechanical fitting can be any type of fitting or fastener that can be used to assemble the housing piece and the end piece together in a manner that places the tapered joint surface of the end piece in contact with the tapered joint surface of the housing piece and maintains an amount of pressure between the two tapered joint surfaces in the lengthwise direction, to produce a fluid-tight seal at the contacting tapered surfaces. In example apparatuses, the mechanical fitting is of a type that allows the fitting to be used to apply a controlled amount of pressure longitudinally between the two opposed surfaces of the tapered joint, e.g., the mechanical fitting may include threaded surfaces that can be rotated to increase or decrease an amount of pressure applied longitudinally between the two opposed tapered surfaces.

According to one example apparatus, referred to as a "three-piece apparatus," the mechanical fitting includes a threaded surface of a collar (e.g., a "compression collar") that is separate from the end piece and is separate from the housing piece. The threaded collar has a threaded surface that engages a complementary threaded surface of the housing piece while the end piece is located between the threaded collar and the housing piece. The end piece does not require a threaded surface that is adapted to engage the threaded surface of the housing piece or the threaded surface of the end piece. The threaded collar also has a shoulder surface that contacts a complementary surface of the end piece, such as a flange, to apply pressure to the end piece longitudinally in a direction of the housing piece. The flange may be a permanent (integral) structure of the end piece or may alternately be attached to the end piece in an adjustable manner, such as by a threaded fitting that allows an adjustable flange to be adjustably located along a length of the end piece (see the "four-piece" example at FIGS. 1C and 1D).

With a first end of the end piece being engaged with the housing piece, and with the threaded collar being placed over the second end of the end piece, with the threaded surface of the collar being engaged with the threaded surface of the housing piece, the threaded collar can be rotated around the threaded surface of the housing piece to apply pressure to a surface of the end piece and to cause the end piece to advance toward the housing piece. The tapered surface of the end piece contacts the tapered surface of the housing piece, and the collar can be rotated by an amount that produces a controlled amount of pressure between the opposed surfaces of the tapered joint to produce a leak-proof seal between the two opposed surfaces.

According to a different example apparatus, referred to as a "two-piece apparatus," the mechanical fitting includes a threaded surface of the end piece that directly engages a complementary threaded surface of the housing piece, while the end piece engages the housing piece. With the threaded surface of the end piece being engaged with the threaded surface of the housing piece, the end piece can be rotated relative to the threaded surface of the housing piece to cause a tapered surface of the end piece to advance toward a tapered surface of the housing piece. The tapered surface of the end piece contacts the tapered surface of the housing piece and the end piece can be rotated a desired amount to produce a controlled amount of pressure between the opposed surfaces of the tapered joint, to produce a leak-proof seal between the two opposed surfaces.

Referring to FIG. 1A, illustrated is an exploded side view of an example high pressure filter apparatus 100 as described. Apparatus 100 includes housing piece 102, end piece 104, filter 106, and collar 108. Apparatus 100 is referred to as a "three-piece" apparatus because the apparatus includes: a housing piece, a separate end piece, and a separate collar piece that includes a portion of mechanical fitting (a threaded surface) that is not incorporated into the end piece. As illustrated, apparatus 100 may be referred to as having a "front" end in a direction toward fitting 108 and a "back" end in a direction toward housing piece 102. The terms "front" and "back" are for convenience when referring to features of apparatus 100 and do not refer to any structural requirement or manner of use of apparatus 100, such as a direction of flow of a fluid through apparatus 100, which can be in either direction between the front and the back of apparatus 100.

Housing piece 102 includes filter chamber 120 extending in a length-wise direction within an interior of housing piece 102, defined by interior surfaces of cylindrical sidewalls of housing piece 102. At one end (the "back" end) of housing piece 102 is first fluid flow opening 130, and at a second end (the "front" end) of housing piece 102 is second fluid flow opening 132. Between opening 132 and filter chamber 120, housing piece 102 includes conical (or otherwise tapered) surface 110, shown as a female surface, but which may alternately be a male surface. Filter 106 is adapted to fit within filter chamber 120 such that fluid that flows between fluid flow opening 130 and fluid flow opening 132, in either direction, must pass through filter 106. At an end of housing piece 102 is threaded outer surface 134 adapted to engage threaded inner surface 162 of mechanical fitting 108.

End piece 104 includes flow channel 144 at an interior that is defined by interior surfaces of cylindrical sidewalls of end piece 104. At one end (the "back" end) of end piece 104 is first fluid flow opening 140 and at a second end (the "front" end) of end piece 104 is second fluid flow opening 142. Also at an end of end piece 104 is conical (or otherwise tapered) surface 150, adapted to engage conical surface 110 of housing piece 102 to form a tapered, e.g., conical joint. Conical surface 150 is shown as a male surface but may alternately be a female surface. At a position along the length of end piece 104 between the front end and the back end is flange 146, which includes front surface 148 adapted to contact shoulder surface 174 of mechanical fitting 108.

Apparatus 100 includes a mechanical fitting in the form of opposed threaded surfaces that can be reversibly assembled and dis-assembled to assemble and dis-assemble apparatus 100. One threaded surface of the mechanical fitting is threaded surface 134 of housing piece 102, and the other threaded surface of the mechanical fitting is threaded surface 162 of collar 108. Collar 108 additionally includes channel 160 extending along a length of collar 108 between a first end (the "back" end) and opening 170 and at a second end (the "front" end) having second opening 172. Collar 108 is illustrated as a compression collar, which includes threaded inner surface 162 to engage a threaded surface of housing piece 102, and shoulder surface 174 adapted to contact and apply pressure to front surface 148 of end piece 104. When assembled, opposing conical surfaces 110 and 150 function as sealing surfaces that can be brought together under pressure into direct contact with each other, with no gasket between the two opposed surfaces, to produce a liquid-tight seal.

Figure 1B:
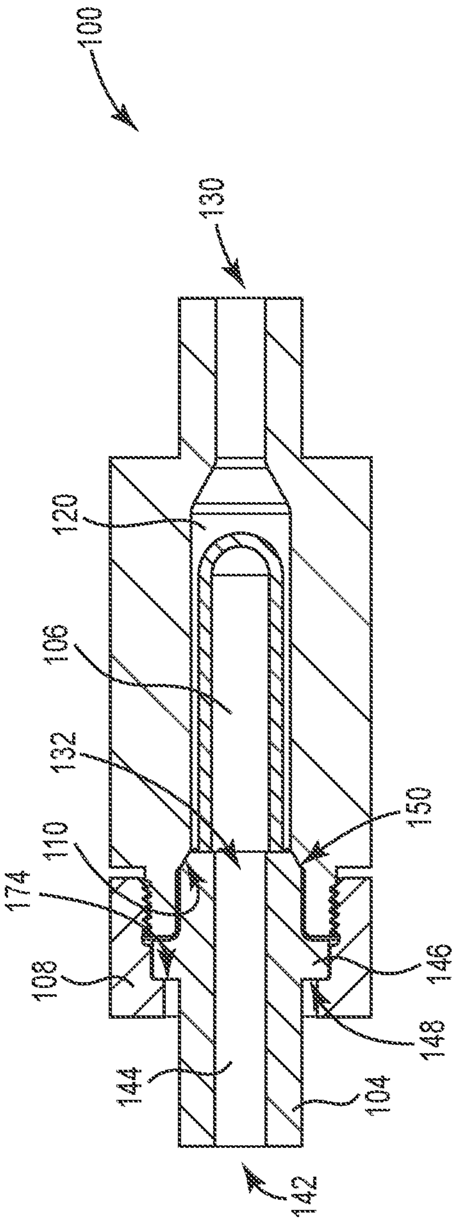

FIG. 1B shows apparatus 100 in an assembled form. To assemble apparatus 100, collar 108 is placed over the front end of end piece 104, and the back end of end piece 104 is placed through opening 132 of housing piece 102. Threaded surface 162 of collar 108 is brought to engage threaded surface 134 of housing piece 102, to form a mechanical fitting between the two opposed threaded surfaces. Shoulder surface 174 of mechanical fitting 108 engages front surface 148 of end piece 104. As collar 108 is rotated about outer threaded surface 134, collar 108 applies pressure to flange 146 and causes conical surface 150 of end piece 104 to advance toward conical surface 110 of housing piece 102 and to contact conical surface 110. Under sufficient pressure between conical surfaces 110 and 150, the two surfaces form a liquid-tight seal as described herein that can contain a flow of fluid within the interior of apparatus 100 at significantly high pressure and temperature.

Filter 106 is disposed within filter chamber 120 of housing piece 102 and held between back opening 130 of housing piece 102 and front opening 142 of end piece 104 connected to housing piece 102. One side of filter 106 is in fluid communication with opening 142 and a second side of filter 106 is in fluid communication with opening 130. Openings 142 and 130 provide an inlet ("housing inlet") and an outlet ("housing outlet") for high pressure filter apparatus 100. In use, either opening may be the inlet and either opening may be the outlet. The inlet and the outlet allow for apparatus 100 to be connected to a high pressure filter fluid flow circuit.

Figure 1C:
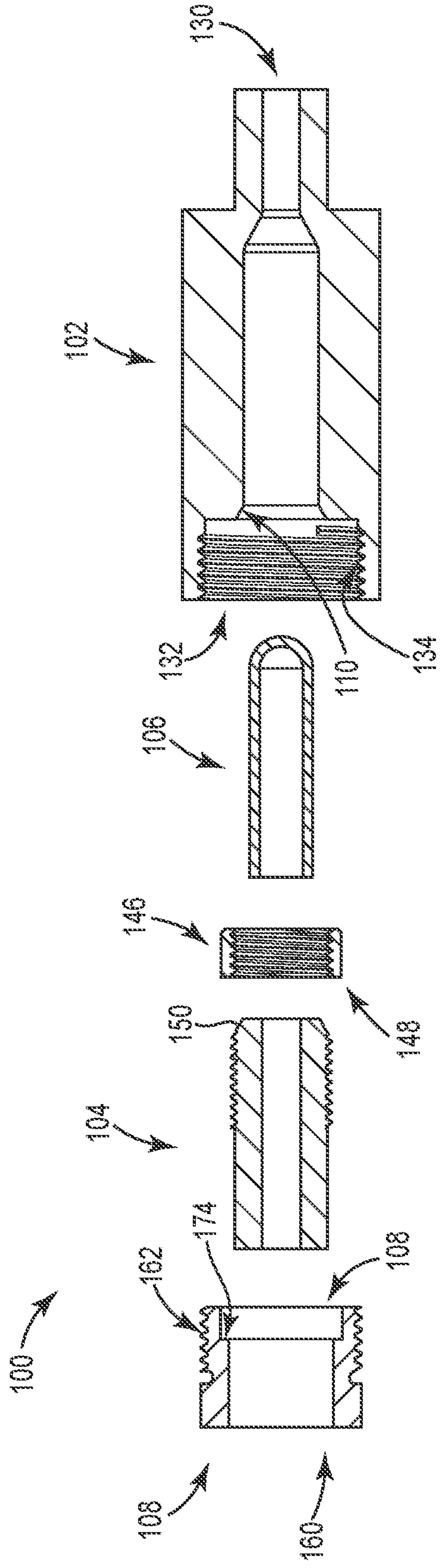
FIGS. 1C and 1D show an exploded view and an assembled view of an example filtering apparatus as described.
Figure 1D:
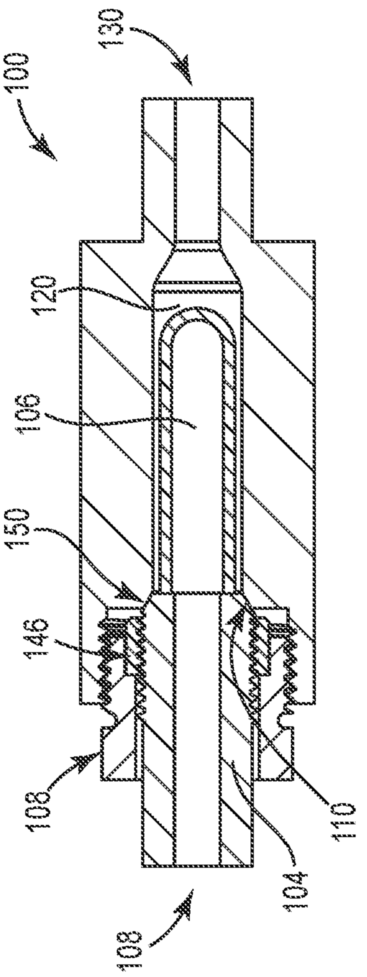

FIGS. 1C and 1D show a variation of apparatus 100 of FIGS. 1A and 1B. According to apparatus 100 of FIGS. 1C and 1D, moveable flange 146 engages end piece 104 at a threaded engagement that allows flange 146 to be adjustably positioned along the length of end piece 104.

Apparatus 100 of FIGS. 1C and 1D may be referred to as a "four-piece" apparatus because the apparatus includes: a housing piece, a separate end piece, a separate collar piece that includes a portion of a mechanical fitting (a threaded surface) that is not incorporated into the end piece, and the adjustable flange piece.

As compared to example apparatus 100 of FIGS. 1A and 1B, in addition to the adjustable flange piece 148 that can be moved along a length of end piece 104, an added difference is the arrangement of the opposed threaded surfaces of the mechanical fitting formed between collar 108 and housing piece 102. In specific, as included in apparatus 100 of FIGS. 1A and 1B, housing piece 102 includes threaded surface 132 at an outer surface of housing piece 102, and collar 108 includes threaded surface 162 at an inner surface. In contrast, as included in apparatus 100 of FIGS. 1C and 1D, housing piece 102 includes threaded surface 132 at an inner surface of housing piece 102, and collar 108 includes threaded surface 162 at an outer surface. The arrangement at FIGS. 1C and 1D can advantageously allow for the use of a collar 108 that has diameter that is smaller than the diameter of collar 108 shown at FIGS. 1A and 1B.

End piece 104 includes moveable flange 146, which includes a threaded inner surface that engages a threaded outer surface of end piece 104. Collar 108 fits over a front end of end piece 104 and includes shoulder surface 174 adapted to contact and apply pressure to front surface 148 of moveable flange 146. By rotating collar 108 to advance collar 108 toward front surface 148, shoulder surface 174 presses against front surface 148 and moves end piece 104 toward housing piece 102. As desired, moveable flange 148 can be placed at a location to provide desired positioning of end piece 104 relative to housing piece 102 during assembly. Preferably, to prevent un-controlled rotation of moveable flange 148 around the threaded portion of end piece 104 during use, the threads between moveable flange 148 and the outer surface of end piece 104 can be an opposite thread direction, e.g., "reverse threaded" (e.g., a left-hand-thread) compared to the thread direction of inner threaded surface 134 and outer threaded surface 162 (e.g., having a right-hand thread).

FIG. 1D shows apparatus 100 in an assembled form. Moveable flange 146 is placed over the threaded exterior of end piece 104 and moved to a desired location along the length of end piece 104. Collar 108 is placed over the front end of end piece 104, and the back end of end piece 104 is placed into opening 132 of housing piece 102. Threaded surface 162 of collar 108 is brought to engage threaded surface 134 of housing piece 102 to form a mechanical fitting between the two surfaces. Shoulder surface 174 of collar 108 engages front surface 148 of moveable flange 146 installed at the outer threaded surface of end piece 104. As collar 108 is rotated about inner threaded surface 134, collar 108 applies pressure to flange 146 and causes conical surface 150 of end piece 104 to advance toward conical surface 110 of housing piece 102 and to contact conical surface 110. Under sufficient pressure between conical surfaces 110 and 150, the two surfaces form a liquid-tight seal that can contain a flow of fluid within the interior of apparatus 100 at significantly high pressure and temperature.

Figure 2A:
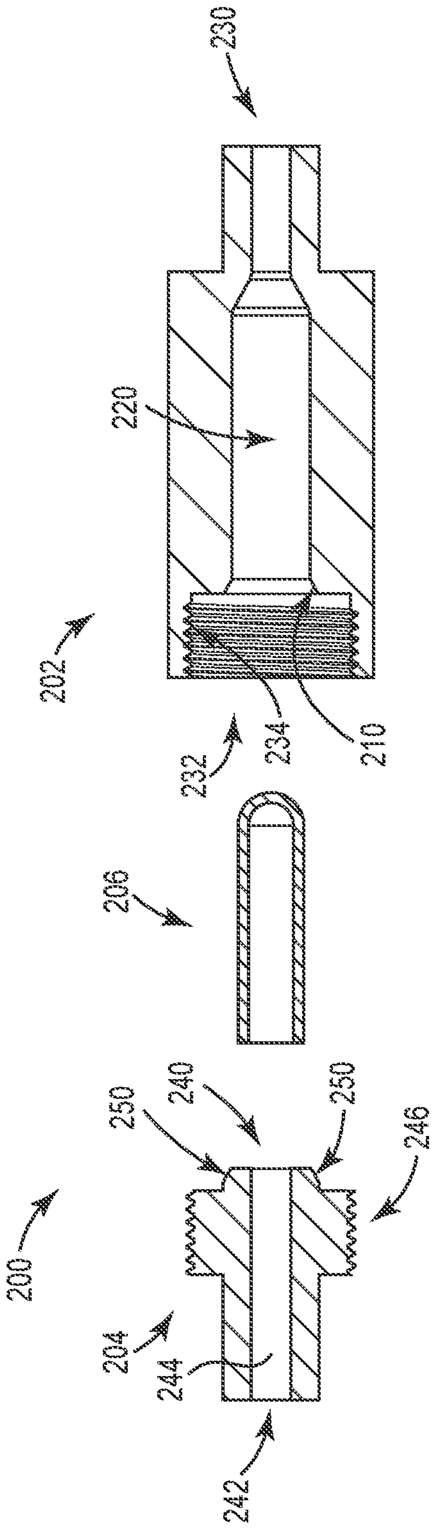
FIGS. 2A and 2B show an exploded view and an assembled view of an example filtering apparatus as described.

Referring to FIG. 2A, illustrated is an exploded side view of a different example high pressure filter apparatus as described. Apparatus 200 includes housing piece 202, end piece 204, and filter 206. Apparatus 200 is referred to as a "two-piece" apparatus because the apparatus includes a housing piece and an end piece, with a portion of a mechanical fitting being incorporated into the housing piece in the form of inner threaded surface 234, and a portion of the mechanical fitting being incorporated into the end piece in the form of outer threaded surface 246.

Housing piece 202 includes filter chamber 220 extending in a length-wise direction within an interior of housing piece 202. At one end (the "back" end) of housing piece 202 is first fluid flow opening 230, and at a second end (the "front" end) of housing piece 202 is second fluid flow opening 232. Between opening 232 and filter chamber 220, housing piece 202 includes conical (or otherwise tapered) surface 210, shown as a female surface but which may alternately be a male surface. Filter 206 is adapted to fit within filter chamber 220 such that fluid that flows between fluid flow opening 230 and fluid flow opening 232 must pass through filter 206. At an end of housing piece 202 is threaded surface 234 adapted to engage threaded surface 246 of end piece 204. Together, threaded surface 234 of housing piece 202 and threaded surface 246 of end piece 204 are a "mechanical fitting" as described.

End piece 204 includes flow channel 244 at an interior. At one end of end piece 204 is first fluid flow opening 240 and at a second end of end piece 204 is second fluid flow opening 242. Also at an end of end piece 204 is conical (or otherwise tapered) surface 250, adapted to engage conical surface 210 of housing piece 202 to form a tapered (e.g., conical) joint. Along the length of end piece 204 is threaded surface 246, adapted to engage threaded surface 234 of housing piece 202.

Figure 2B:
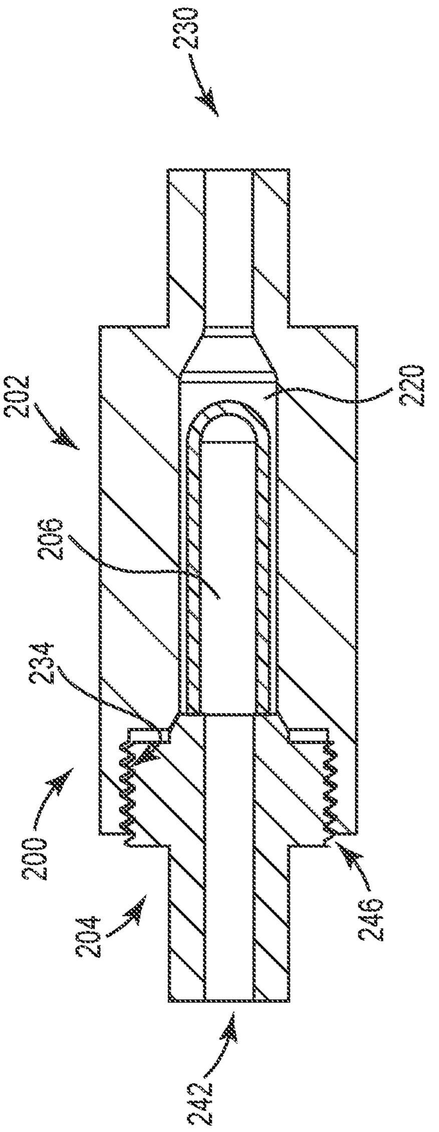

When housing piece 202 and end piece 204 are assembled to form apparatus 200 (see FIG. 2B), opposing conical surfaces 210 and 250 function as sealing surfaces that can be brought together under pressure into direct contact with each other to produce a fluid-tight seal, with no gasket material being placed between the two opposed surfaces.

To assemble apparatus 200, threaded surface 246 of end piece 204 is brought to engage threaded surface 234 of housing piece 202 to form a mechanical fitting that can be selectively and reversibly assembled and dis-assembled. See FIG. 2B. The back end of end piece 204 with opening 240 passes through the front end of housing 202 to place conical surface 250 of end piece 204 in an orientation that allows conical surface 250 to face and contact conical surface 210 of housing piece 202.

As end piece 204 is rotated relative to threaded surface 234, conical surface 250 of end piece 204 advances toward conical surface 210 of housing piece 202 and contacts conical surface 210. Under sufficient pressure between conical surface 210 and 250, the two surfaces form a fluid-tight seal as described herein, that can contain a flow of fluid within the interior of apparatus 200 at significantly high pressure and temperature.

Filter 206 is disposed within filter chamber 220 of housing piece 202 and held between back opening 230 of housing piece 202 and front opening 242 of end piece 204 connected to housing piece 202. One side of filter 206 is in fluid communication with opening 242 and a second side of filter 206 is in fluid communication with opening 230. Openings 242 and 230 provide an inlet (a "housing inlet") and an outlet (a "housing outlet") for high pressure filter apparatus 200. In use, either opening may be the housing inlet and either opening may be the housing outlet. The inlet and the outlet allow for apparatus 200 to be connected to a high pressure filter fluid flow circuit.

A "filter membrane" or (a.k.a., "filter element") that may be held at an interior of a filter apparatus as described, to remove a contaminant from a flow of fluid that passes through the filter membrane, may be any useful filter membrane, including a type of filter membrane that is known for processing a fluid at a high temperature, a high pressure, or both.

The filter membrane may, for example, be a sintered porous filter element that is known to be useful for the filtration of liquid metals and gases at high pressure or temperature.

A useful filter membrane may have a pore sizes in a range from about 0.1 to about 5 microns, e.g., from about 0.5 to about 1.5 microns, as measured by bubble point per ASTM E128. Example filter membranes may be made from materials that include: titanium, tungsten, tantalum, molybdenum, niobium, alumina, titanium oxide, titanium nitride, and silicon carbide.

Filter elements of the present disclosure can be used for the filtration of a variety of liquid metals and gases. For example, filter elements of the present disclosure can be used to filter gases ranging from inert gases, such as argon, to corrosive gases, such as hydrogen bromide. Gases that can be filtered include, for example, argon, nitrogen, carbon dioxide, hydrogen bromide, and hydrogen chloride, and hydrides. Filter elements of the present disclosure can also be used to filter supercritical fluids, such as carbon dioxide in a supercritical state.

A filter apparatus as described can be used to filter gases and liquids, including molten metals ("liquid metals"). Metals that can be filtered include tin, lead, sodium, cadmium, selenium, mercury, and, in general, materials that melt below about 400 degrees Celsius. Gases that can be processed at high temperatures and pressures include argon, nitrogen ($N_2$), hydrogen bromide (HBr), hydrogen chloride (HCl), and carbon dioxide ($CO_2$), as non-limiting examples.

Following are example apparatuses and methods of the present description.

Aspect 1. A high pressure filter apparatus having sealing surfaces between a housing piece and an end piece, the filter apparatus comprising:
- the housing piece comprising
  - a first tapered joint surface,
  - a filter chamber, and
  - a fluid flow opening connected to the filter chamber;
- a filter located in the filter chamber,
- the end piece comprising
  - a second tapered joint surface contacting the first tapered joint surface under pressure, without a gasket material placed between the first tapered joint surface and the second tapered joint surface, and
  - a fluid flow opening connected to the filter chamber, and
- a mechanical fitting that releasably secures the end piece to the housing piece with pressure to form a seal between the first tapered joint surface and the second tapered joint surface.

Aspect 2. The filter apparatus of Aspect 1, wherein:
- the end piece comprises a threaded surface,
- the housing piece comprises a threaded surface that is complementary to the threaded surface of the end piece, and
- the mechanical fitting comprises the threaded surface of the housing piece engaged with the threaded surface of the end piece.

Aspect 3. The filter apparatus of Aspect 1, wherein:
- the housing piece comprises a threaded surface,
- the apparatus further comprises a collar that includes a threaded surface that is complementary to the threaded surface of the housing piece,
- the end piece includes an end that engages the housing piece and an end that engages the collar, and
- the mechanical fitting comprises the threaded surface of the housing piece engaged with the threaded surface of the collar.

Aspect 4. The filter apparatus of any of Aspects 1 through 3, wherein the housing piece and the end piece each comprise a refractory metal.

Aspect 5. The filter apparatus of any of Aspects 1 through 4, wherein the filter comprises: titanium, silicon carbide, tungsten, tantalum, molybdenum, niobium, alumina, titanium oxide, or titanium nitride.

Aspect 6. The filter apparatus of any of Aspects 1 through 5, wherein the filter has an average pore size in a range from 0.1 to 5 microns.

Aspect 7. The filter apparatus of any of Aspects 1 through 6, wherein the apparatus is capable of containing fluid in the filter chamber at a fluid pressure of at least 40,000 psig at 20 degrees Celsius without leaking.

Aspect 8. The filter apparatus of Aspect 7, wherein the apparatus is capable of containing the fluid in the filter chamber at a fluid pressure of at least 45,000 psig at 20 degrees Celsius without leaking.

Aspect 9. The filter apparatus of Aspect 7 or 8, wherein the apparatus is capable of containing the fluid in the filter chamber at a fluid temperature of at least 230 degrees Celsius without leaking.

Aspect 10. The filter apparatus of Aspect 7 or 8, wherein the apparatus is capable of containing the fluid in the filter chamber at a fluid temperature of at least 300 degrees Celsius without leaking.

Aspect 11. The filter apparatus of any of Aspects 1 through 10, wherein one of the first and second tapered joint surfaces is a female surface and the other of the first and second tapered joint surfaces is a male surface, and an angle of the female tapered joint surface is at least 0.5 degrees greater than an angle of the male tapered joint surface.

Aspect 12. The filter apparatus of any of Aspects 1 through 11, wherein one or both of the first and second tapered joint surfaces comprise a polished surface.

Aspect 13. The filter apparatus of any of Aspects 1 through 12, wherein one or both of the first and second tapered joint surfaces comprise a heat-treated surface.

Aspect 14. The filter apparatus of any of Aspects 1 through 13, wherein the housing piece comprises refractory metal or refractory metal alloy, and the end piece comprises a different refractory metal or refractory metal alloy.

Aspect 15. The filter apparatus of any of Aspects 1 through 14, wherein the housing piece has a higher hardness than the end piece.

Aspect 16. A method of filtering a fluid, the method comprising:
- providing a high pressure filter apparatus comprising
  - a housing piece comprising
    - a first tapered joint surface,
    - a filter chamber, and
    - a fluid flow opening connected to the filter chamber;
  - a filter located in the filter chamber,
  - an end piece comprising
    - a second tapered joint surface contacting the first tapered joint surface under pressure, without a gasket material placed between the first tapered joint surface and the second tapered joint surface, and
    - a fluid flow opening connected to the filter chamber, and
  - a mechanical fitting that releasably secures the end piece to the housing piece with pressure to form a seal between the first tapered joint surface and the second tapered joint surface,
- passing fluid that contains an impurity through the filter to cause the impurity to be removed from the fluid.

Aspect 17. The method of Aspect 16, comprising passing the fluid through the filter chamber at a fluid pressure of at least 40,000 psig.

Aspect 18. The method of Aspect 16 or 17, comprising passing the fluid through the filter chamber at a fluid temperature of at least 230 degrees Celsius.

Aspect 19. The method of any of Aspects 16 through 18, wherein the housing piece and the end piece each comprise a refractory metal.

Aspect 20. The method of any of Aspects 16 through 19, wherein the filter comprises: titanium, silicon carbide, tungsten, tantalum, molybdenum, niobium, alumina, titanium oxide, or titanium nitride.

Aspect 21. The method of any of Aspects 16 through 20, wherein the fluid is liquid metal.

Aspect 22. A method of forming a high pressure filter apparatus, the method comprising:
- providing:
  - a filter,
  - a housing piece comprising
    - a first tapered joint surface,
    - a filter chamber, and
    - a fluid flow opening connected to the filter chamber;
  - an end piece comprising a second tapered joint surface adapted to contact the first tapered joint surface under pressure,
- securing the filter at a location within the filter chamber,
- connecting the end piece to the housing piece using a mechanical fitting, with pressure to form a seal between the first tapered joint surface and the second tapered joint surface, without placing a gasket material between the first tapered joint surface and the second tapered joint surface.

Aspect 23. The method of Aspect 22, wherein the housing piece and the end piece each comprise a refractory metal.

Aspect 24. The method of Aspect 22 of 23, wherein one of the first and second tapered joint surfaces is a female surface and the other of the first and second tapered joint surfaces is a male surface, and an angle of the female tapered joint surface is at least 0.5 degrees greater than an angle of the male tapered joint surface.

Aspect 25. The method of any of Aspects 22 through 24, wherein one or both of the first and second tapered joint surfaces comprise a polished surface.

Aspect 26. The method of any of Aspects 22 through 25, wherein one or both of the first and second tapered joint surfaces comprise a heat-treated surface.

Aspect 27. The method of any of Aspects 22 through 26, wherein the housing piece comprises refractory metal or refractory metal alloy, and the end piece comprises a different refractory metal or refractory metal alloy.

Aspect 28. The method of any of Aspects 22 through 27, wherein the housing piece has a higher hardness than the end piece.

Aspect 29. A high pressure filter apparatus comprising:
- a fluid inlet at an inlet end,
- a fluid outlet at an outlet end,
- metal sidewalls between the fluid inlet and the fluid outlet,
- a filter chamber defined by the metal sidewalls, and
- a filter located in the filter chamber, wherein the apparatus is capable of containing fluid in the filter chamber at a fluid pressure of at least 40,000 psig at 20 degrees Celsius without leaking.

Aspect 30. The filter apparatus of Aspect 29, wherein the apparatus is capable of containing the fluid in the filter chamber at a fluid pressure of at least 45,000 psig at 20 degrees Celsius without leaking.

Aspect 31. The filter apparatus of Aspect 29 or 30, wherein the apparatus is capable of containing the fluid in the filter chamber at a fluid temperature of at least 230 degrees Celsius without leaking.

Aspect 32. The filter apparatus of any of Aspects 29 through 31, wherein the metal sidewalls comprise a refractory metal.

Aspect 33. The filter apparatus of any of Aspects 29 through 32, wherein the metal sidewalls do not include a welded seam.

Aspect 34. The filter apparatus of any of Aspects 29 through 33, wherein the filter comprises: titanium, silicon carbide, tungsten, tantalum, molybdenum, niobium, alumina, titanium oxide, or titanium nitride.

Aspect 35. The filter apparatus of any of Aspects 29 through 34, wherein the filter has an average pore size in a range from 0.1 to 5 microns.

The invention claimed is:

1. A high pressure filter apparatus comprising:
- a housing piece (102) including:
  - a first end with a first fluid flow opening (130);
  - a second end with a second fluid flow opening (132);
  - a filter chamber (120) defined within the housing piece (102) between the first and second fluid openings (130, 132);
  - a first tapered joint surface (110) within the housing piece (102) between the first and second fluid openings (130, 132); and
  - a threaded outer surface (134) on the second end of the housing piece (104);
- an elongate filter (106) having an open end, and sized to be operably disposed within the filter chamber (120) between the first and second fluid openings (130, 132);
- a cylindrical end piece (104) including:
  - an intermediate, radially extending flange (146) defining an engagement surface (148) axially facing a first end of the cylindrical end piece (104); and
  - a second tapered joint surface (150) disposed at a second end of the cylindrical end piece (104);
- a compression collar (108) including:
  - a first opening (170) at a first end of the compression collar (108);
  - a second opening (172) at a second end of the compression collar (108);
  - a channel (160) extending between the first and second ends of the collar (108);
  - a shoulder engagement surface (174); and
  - a threaded inner surface (162) defined within the channel (160), adjacent the first opening (170);
  - wherein, when assembled, the first end of the cylindrical end piece (104) extends through the channel (108), the threaded inner surface (162) engages the threaded outer surface (134) causing the shoulder engagement surface (174) to engage the engagement surface (148) and translationally urge the cylindrical end piece (104) toward the housing piece, causing the second end of the cylindrical end piece (104) to engage an end perimeter of a filter wall about the opening of the elongate filter (106) and causing the second tapered joint surface (150) to sealingly engage the first tapered joint surface (110) within the housing piece (102) without a gasket material placed therebetween, such that the filter apparatus is capable of filtering fluid through the filter chamber at a fluid pressure of at least 40,000 psig at 20 degrees Celsius without leaking.

2. The filter apparatus of claim 1, wherein the housing piece and the cylindrical end piece each comprise a refractory metal.

3. The filter apparatus of claim 1, wherein the elongate filter includes one or more of: titanium, silicon carbide, tungsten, tantalum, molybdenum, niobium, alumina, titanium oxide, or titanium nitride.

4. The filter apparatus of claim 1, wherein the elongate filter has an average pore size in a range from 0.1 to 5 microns.

5. The filter apparatus of claim 1, wherein the filter apparatus is capable of filtering fluid through the filter chamber at a fluid pressure of at least 45,000 psig at 20 degrees Celsius without leaking.

6. The filter apparatus of claim 1, wherein the filter apparatus is capable of filtering fluid through the filter chamber at a fluid temperature of at least 230 degrees Celsius without leaking.

7. The filter apparatus of claim 1, wherein the filter apparatus is capable of filtering fluid through the filter chamber at a fluid temperature of at least 300 degrees Celsius without leaking.

8. The filter apparatus of claim 1, wherein one of the first and second tapered joint surfaces is a female surface and the other of the first and second tapered joint surfaces is a male surface, and an angle of the female tapered joint surface is at least 0.5 degrees greater than an angle of the male tapered joint surface.

9. The filter apparatus of claim 1, wherein one or both of the first and second tapered joint surfaces comprise a polished surface.

10. The filter apparatus of claim 1, wherein one or both of the first and second tapered joint surfaces comprise a heat-treated surface.

11. The filter apparatus of claim 1, wherein the housing piece comprises refractory metal or refractory metal alloy, and the cylindrical end piece comprises a different refractory metal or refractory metal alloy.

12. The filter apparatus of claim 1, wherein the housing piece has a higher hardness than the cylindrical end piece.

13. The filter apparatus of claim 1, wherein the housing does not include a welded seam.

* * * * *